(12) United States Patent
Aoki

(10) Patent No.: US 10,984,997 B2
(45) Date of Patent: Apr. 20, 2021

(54) MASS SPECTROMETER WITH MAIN VOLTAGE GENERATING UNIT AND AUXILIARY POWER SUPPLY

(71) Applicant: SHIMADZU CORPORATION, Kyoto (JP)

(72) Inventor: Yasushi Aoki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/339,194

(22) PCT Filed: Oct. 4, 2016

(86) PCT No.: PCT/JP2016/079491
§ 371 (c)(1),
(2) Date: Apr. 3, 2019

(87) PCT Pub. No.: WO2018/066064
PCT Pub. Date: Apr. 12, 2018

(65) Prior Publication Data
US 2019/0311893 A1    Oct. 10, 2019

(51) Int. Cl.
*H01J 49/22*    (2006.01)
*H01J 49/02*    (2006.01)
*H01J 49/40*    (2006.01)
*H02J 1/08*    (2006.01)
*H02J 1/10*    (2006.01)

(52) U.S. Cl.
CPC ............ *H01J 49/022* (2013.01); *H01J 49/40* (2013.01); *H02J 1/082* (2020.01); *H02J 1/084* (2020.01); *H02J 1/102* (2013.01)

(58) Field of Classification Search
CPC .. H02J 1/082; H02J 1/084; H02J 1/102; H02J 1/104; H02J 7/345; H01J 49/40; H01J 49/022
See application file for complete search history.

(56) References Cited

U.S. PATENT DOCUMENTS 6,762,561 B1 *    7/2004    Kawato .................. H01J 49/022
                                                            250/292
2003/0214269 A1 *    11/2003    Shiue ...................... H02J 7/345
                                                            320/166
(Continued)

FOREIGN PATENT DOCUMENTS

CN    1728214 A    2/2006
EP    1624434 A2    2/2006
(Continued)

OTHER PUBLICATIONS

Notice of Reasons for Refusal dated Nov. 12, 2019 from the Japanese Patent Office in application No. 2018-543511.
(Continued)

*Primary Examiner* — Harry R Behm
(74) *Attorney, Agent, or Firm* — Sughrue Mion, PLLC

(57) ABSTRACT

A switch circuit is turned ON and switch circuits are turned OFF to apply a negative direct-current voltage from a negative voltage generating unit to a flight tube, and while a measurement is conducted, a switch circuit is turned ON, and a capacitor is charged by an auxiliary positive voltage generating unit. When the polarity of the applied voltage is switched from negative to positive, the switch circuit is turned OFF and the switch circuit is turned ON to supply a large current from the capacitor to the flight tube, thus the capacitance of the flight tube is charged to a positive potential quickly. After that, the switch circuit is turned OFF and the switch circuit is turned ON to apply a stable positive direct-current voltage from a positive voltage generating unit to the flight tube.

12 Claims, 5 Drawing Sheets

(56) References Cited

U.S. PATENT DOCUMENTS

| | | | |
|---|---|---|---|
| 2004/0112320 A1* | 6/2004 | Bolz | H02J 7/1446 123/179.28 |
| 2004/0132083 A1 | 7/2004 | Kawato et al. | |
| 2006/0022904 A1 | 2/2006 | Kwak et al. | |
| 2011/0101218 A1* | 5/2011 | Makarov | H01J 49/022 250/282 |
| 2016/0138550 A1* | 5/2016 | Kirlew | F02N 11/0866 290/38 R |
| 2017/0302094 A1* | 10/2017 | Lynds | B60L 3/0046 |

FOREIGN PATENT DOCUMENTS

| | | |
|---|---|---|
| JP | 2004214077 A | 7/2004 |
| JP | 2006039576 | 2/2006 |
| JP | 2006-080031 A | 3/2006 |
| JP | 2010-249981 A | 11/2010 |
| KR | 1020060011216 A | 2/2006 |
| KR | 1020060023084 A | 3/2006 |
| WO | 2009/144469 A1 | 12/2009 |

OTHER PUBLICATIONS

Written Opinion dated Nov. 28, 2017 from the International Bureau in application No. PCT/JP2017/031773.

International Search Report for PCT/JP2016/079491 dated Dec. 13, 2016 [PCT/ISA/210].

Written Opinion for PCT/JP2016/079491 dated Dec. 13, 2016 [PCT/ISA/237].

Extended European Search Report dated Apr. 20, 2020 in European Application No. 16918264.9.

* cited by examiner

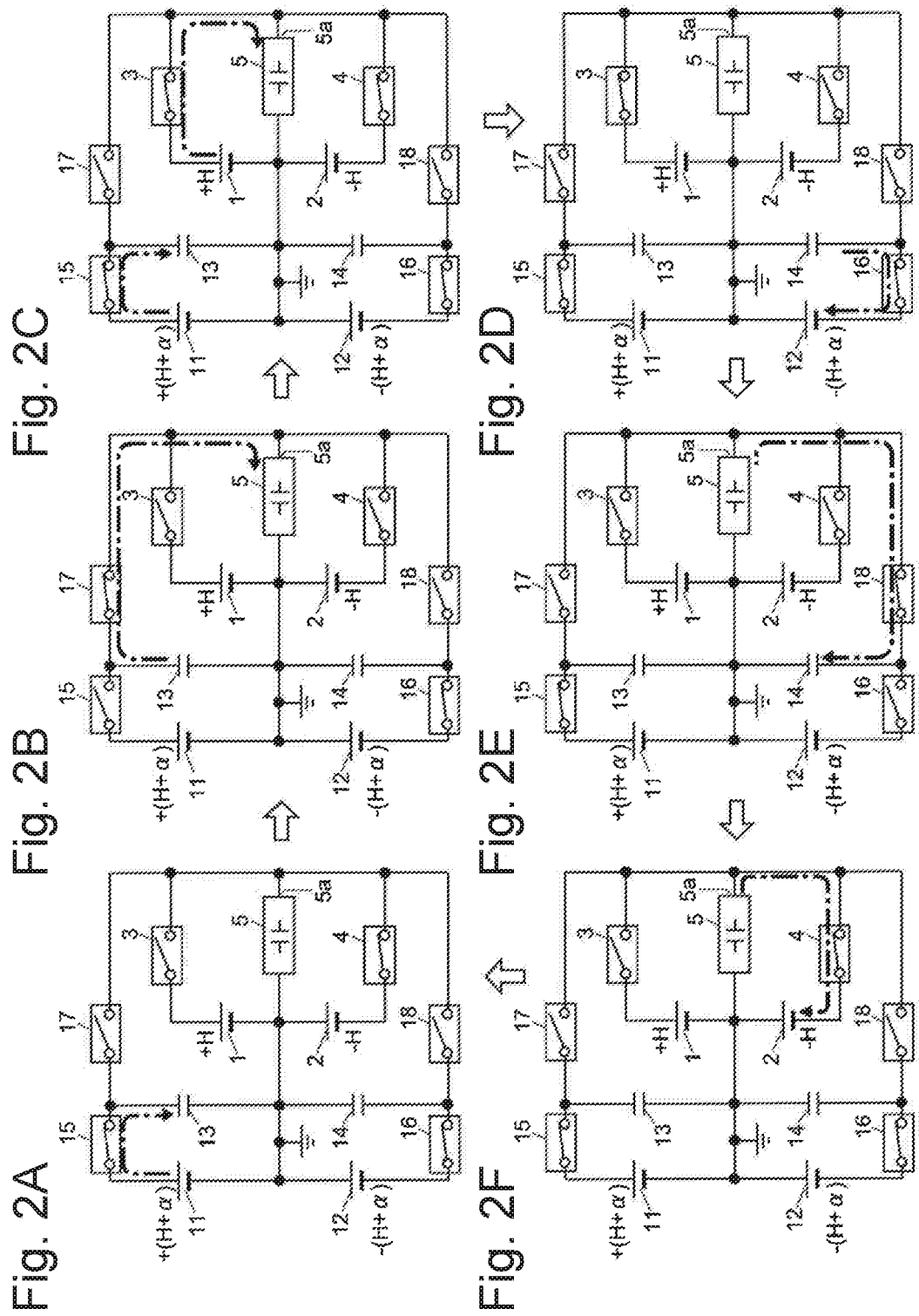

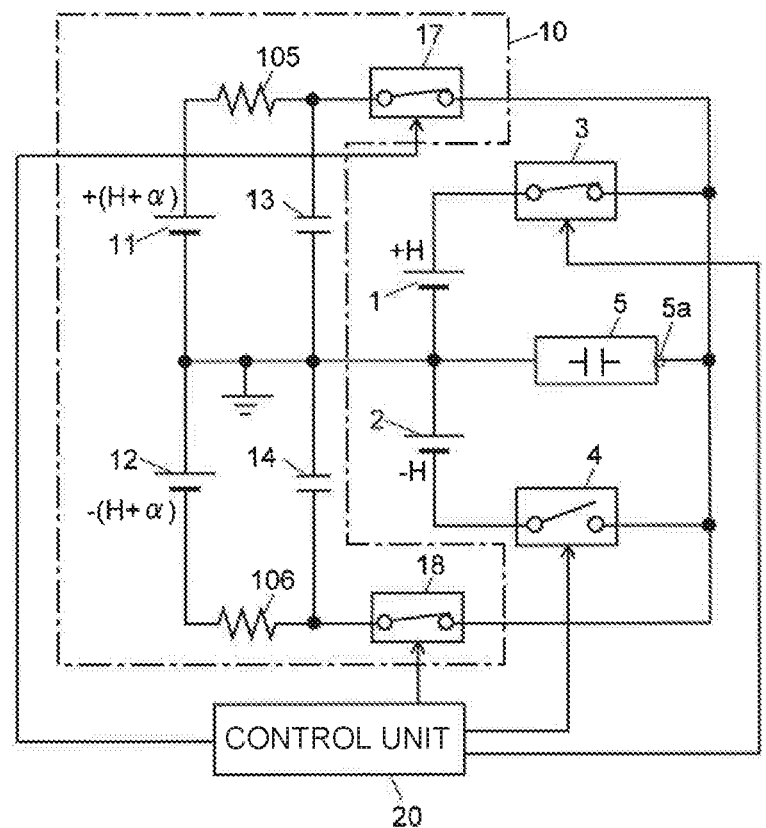

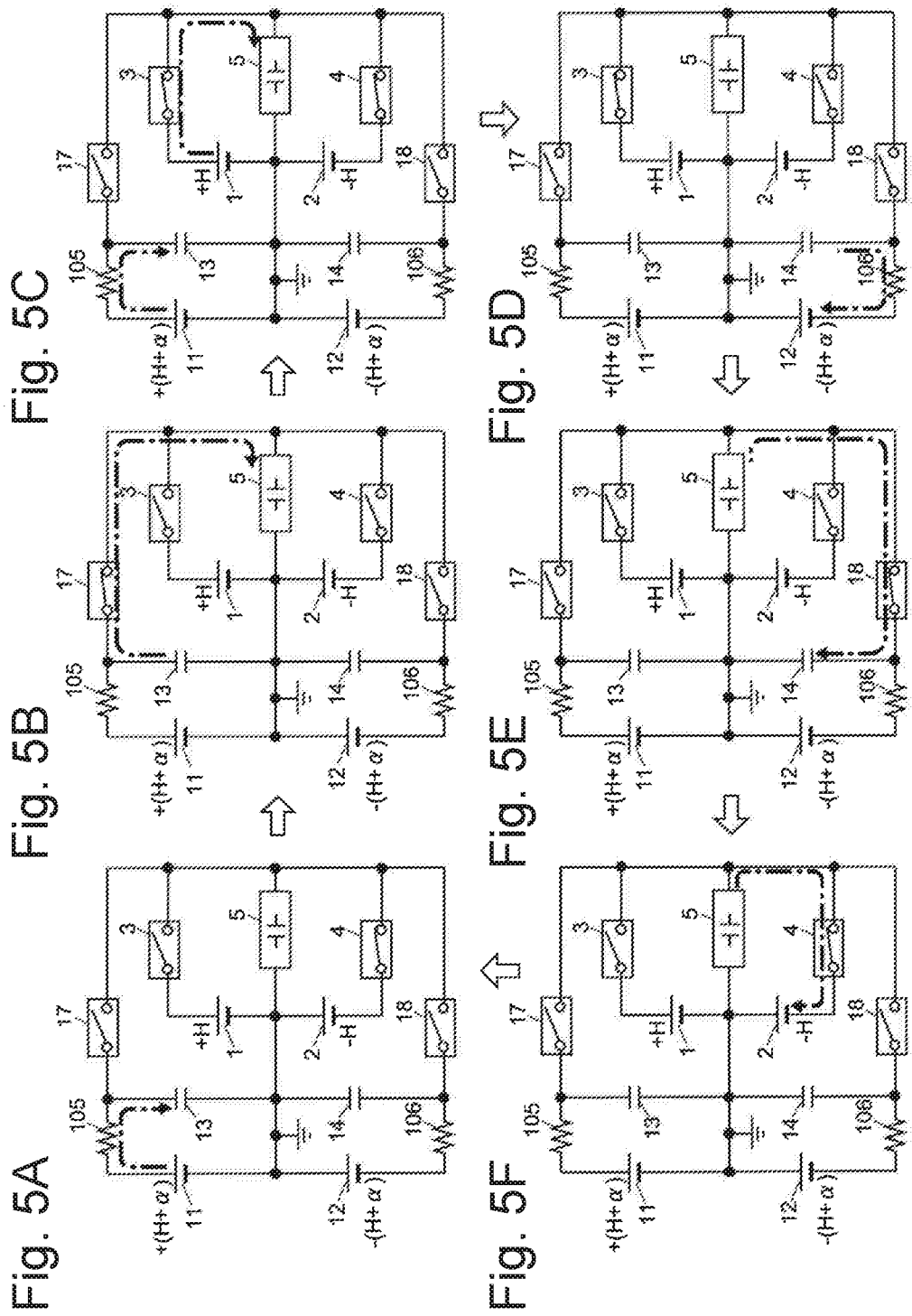

MASS SPECTROMETER WITH MAIN VOLTAGE GENERATING UNIT AND AUXILIARY POWER SUPPLY

CROSS REFERENCE TO RELATED APPLICATIONS

This application is a National Stage of International Application No. PCT/JP2016/079491 filed Oct. 4, 2016.

TECHNICAL FIELD

The present invention relates to a mass spectrometer with a high-voltage power supply device, and more particularly to a mass spectrometer with a high-voltage power supply device suitable for applying a direct-current high voltage to a capacitive load having a relatively high capacitance, such as a flight tube of a time-of-flight mass spectrometer.

BACKGROUND ART

A time-of-flight mass spectrometer (hereinafter, referred to as "TOFMS" in accordance with the common usage) measures a time-of-flight required for various ions derived from a sample to fly in a flight space formed in a flight tube from when the ions have been emitted from an ion emitting unit. Since flying ions have a speed depending on their mass-to-charge ratio m/z, the above-described time-of-flight depends on respective mass-to-charge ratios of the ions, thus a mass-to-charge ratio can be found from a time-of-flight of each ion.

As disclosed in Patent Literature 1, for example, in a TOFMS, a flight tube is applied with a direct-current high voltage of about a few to a dozen kilovolts, whose polarity differs depending on the polarity of an ion to be analyzed, from a high-voltage power supply device capable of switching and outputting direct-current high voltage of both positive and negative polarities. If the potential of the flight tube changes during execution of analysis, the flight time of the ion varies, which may decrease the mass accuracy and the mass resolution. Furthermore, in some reflectron TOFMSs, the potential of the flight tube serves as a reference potential of the reflectron, which forms a reflection electric field for reflecting ions; in such a case, the influence of a change in the potential of the flight tube during execution of analysis on the mass accuracy is even greater.

Accordingly, the above-described high-voltage power supply device is required to output a direct-current high voltage of about a few to a dozen kilovolts at high stability with a voltage fluctuation of about a few parts per million or less. Furthermore, in a TOFMS capable of repeatedly and alternately conducting a measurement of positive ions and a measurement of negative ions, switching of the polarity of an output voltage from a high-voltage power supply device needs to be performed within a short period; therefore, it is also required to decrease the time as much as possible to stabilize the voltage when the polarity of the output voltage is switched.

FIGS. 6A to 6D are schematic configurations of a conventional, general high-voltage power supply device for a flight tube and an explanatory diagram of its operation.

As shown in FIG. 6A, this high-voltage power supply device includes a positive voltage generating unit 1 that outputs a positive-polarity direct-current high voltage with a voltage value of H [V], a negative voltage generating unit 2 that outputs a negative-polarity direct-current high voltage with a voltage value of –H [V], a positive-side switch circuit 3 provided on a line electrically connecting the positive voltage generating unit 1 and a flight tube 5, which is a load, and a negative-side switch circuit 4 provided on a line electrically connecting the negative voltage generating unit 2 and the flight tube 5. In general, the switch circuits 3 and 4 each include one or more MOSFETs as a semiconductor switching device. Furthermore, as the positive voltage generating unit 1 and the negative voltage generating unit 2, a booster circuit having voltage doubler rectifier circuits, such as Cockcroft-Walton circuits, connected in multiple stages is used in many cases. The voltage value ±H of the direct-current high voltage is generally about ±5 to ±10 [kV]. The flight tube 5 is a metallic, substantially cylindrical tube with a length of about 1 to 2 [m], and is a capacitive load having a capacitance of Ca [F].

In a TOFMS, when a high voltage applied to the flight tube 5 is alternately switched between positive and negative to alternately perform a measurement of positive ions and a measurement of negative ions, the positive-side switch circuit 3 and the negative-side switch circuit 4 are alternately turned ON and OFF. However, in order to prevent turning both of the switch circuits 3 and 4 into ON state simultaneously, these switch circuits 3 and 4 are generally controlled so that after one of the switch circuits (for example, the positive-side switch circuit 3) is switched from ON state to OFF state, the other switch circuit (for example, the negative-side switch circuit 4) is switched from OFF state to ON state.

Now, if the positive-side switch circuit 3 is turned ON from a state where both of the switch circuits 3 and 4 are OFF, a current i1 flows from the positive voltage generating unit 1 to the flight tube 5 through the positive-side switch circuit 3, and the capacitance of the flight tube 5 is charged (see FIG. 6A). When the capacitance is fully charged, the potential of a voltage-applied-side end 5a of the flight tube 5 becomes stable at +H [V], and in that state, a measurement is conducted (see FIG. 6B). After the measurement ends, in order to switch so that a negative high voltage is applied to the flight tube 5, first, the positive-side switch circuit 3 is turned OFF, and then the negative-side switch circuit 4 is turned ON. Then, a current i2 based on the charge previously accumulated in the capacitance of the flight tube 5 flows from the flight tube 5 to the negative voltage generating unit 2 through the negative-side switch circuit 4. And then, the capacitance is charged to the opposite polarity (see FIG. 6C). When the capacitance is fully charged to the opposite polarity, the potential of the voltage-applied-side end 5a of the flight tube 5 becomes stable at –H [V], and in that state, a measurement is conducted (see FIG. 6D).

Although the capacitance of the flight tube 5 depends on its size, etc., it is generally about a few hundreds of picofarads to a few nanofarads. A stabilization time ts required for the potential of the voltage-applied-side end 5a of the flight tube 5 to be stabilized depends on the current supply capacity of the voltage generating unit 1 or 2 and its responsiveness to a change in the load, where the stabilization time ts is the time from a point of time at which the switch circuits 3 and 4 are switched to ON state to a point of time when the potential of the voltage-applied-side end 5a of the flight tube 5 is stabilized in a positive direction or a negative direction. If the current supply capacity is increased (i.e., if the current i1 or i2 is increased), the stabilization time ts is shortened. But the larger the current supply capacity is increased, the higher the cost of the voltage generating unit 1 or 2 becomes. Furthermore, if the responsiveness of the voltage generating unit 1 or 2 to a change in the load is increased, the stabilization time ts is shortened, but the stability in a direct-current voltage may decrease. Due to such restraints, there are limitations to increase the current supply capacity of the voltage generating unit 1 or 2 and its responsiveness to a change in the load. Thus, in a case where the capacitance of the flight tube 5 is about a few nanofarads, the stabilization time is in a conventional high-voltage power supply device is about a few hundreds of milliseconds, and this length of time is a significant restraint on shortening the time to switch the polarity of an applied voltage to the flight tube 5, i.e., shortening a measurement period with which a measurement of positive ions and a measurement of negative ions are alternately conducted.

Furthermore, such problems occur not only when the polarity of an output voltage is switched between positive and negative, but also when application of the voltage is started from a state where application of the voltage is at a stop, i.e., when an applied voltage is risen from zero to +H [V] or −H [V].

Moreover, not only a high-voltage power supply device that applies a high voltage to the flight tube 5, but also a high-voltage power supply device that applies a stable direct-current high voltage to a load (a capacitive load) having a relatively large capacitance has similar problems.

CITATION LIST

Patent Literature

Patent Literature 1: JP 2006-80031 A

SUMMARY OF INVENTION

Technical Problem

The present invention has been made to solve the above-described problems, and is mainly intended, in a mass spectrometer with a high-voltage power supply device that applies a stable high voltage to a capacitive load, to shorten the time of voltage rise when an application of the voltage is started from a halted state or when the polarity of the applied voltage is switched while suppressing the increase in device cost.

Solution to Problem

The present invention made to solve the above-described problems is a mass spectrometer with a high-voltage power supply device that applies a direct-current high voltage to a load, and includes:

a) a main voltage generating unit configured to generate a predetermined direct-current high voltage;

b) a switch unit configured to open and close a line connecting a voltage output terminal of the main voltage generating unit and the load; and c) an auxiliary power supply unit configured to charge a capacitance of the load by supplying the load with a larger current than a current being able to be supplied by the main voltage generating unit before or immediately after the switch unit is closed when application of the direct-current high voltage to the load by the main voltage generating unit is started by closing the switch unit being in an open state.

In the high-voltage power supply device according to the present invention, when the switch unit being in an open state is closed, the main voltage generating unit and the load are connected through the switch unit, and the direct-current high voltage generated by the main voltage generating unit is applied to the load. At this time, the auxiliary power supply unit supplies the load with a larger current than a current being able to be supplied by the main voltage generating unit immediately before or immediately after the switch unit is closed for a short time. In a case where the direct-current high voltage applied to the load is positive, the auxiliary power supply unit should supply the load with a positive current (i.e., cause the current to flow into the load); on the other hand, in a case where the direct-current high voltage applied to the load is negative, the auxiliary power supply unit should supply the load with a negative current (i.e., draw out the current from the load). The capacitance of the load is rapidly charged with this current supplied from the auxiliary power supply unit, thus charge of the capacitance by current supply from the main voltage generating unit to the load becomes unnecessary or reduced, and the potential of the load is settled to an intended value in a short time after the switch unit is closed.

In a case where a less-fluctuating, stable direct-current high voltage is applied to the load, as described above, the current supply capacity of the main voltage generating unit is subjected to restraints because of cost factors, etc. On the other hand, the auxiliary power supply unit is mainly intended to charge the capacitance of the load at the time of voltage rise alone, thus may be configured to be able to supply a large current only for a short time.

Accordingly, in the high-voltage power supply device according to the present invention, the auxiliary power supply unit may be configured to include a capacitor, a charge power supply unit configured to charge the capacitor, and a first auxiliary switch unit configured to open and close a line connecting the capacitor and the load.

In this configuration, before application of the direct-current high voltage to the load by the main voltage generating unit is started by switching the switch unit from an open state to a closed state, the capacitor is charged by the charge power supply unit in advance. Then, by closing the first auxiliary switch unit for a short time, for example, immediately before the switch unit is switched from an open state to a closed state, a current generated by the charge accumulated in the capacitor is supplied to the load through the first auxiliary switch unit to charge the capacitance of the load. After the first auxiliary switch unit is again opened, and the capacitor is separated from the load, the switch unit is closed, and the direct-current high voltage generated by the main voltage generating unit is applied to the load. By opening the first auxiliary switch unit, the charge accumulated in the capacitor is discharged, and a large current can be supplied to the load though briefly. Accordingly, the potential of the load can be increased in a short time, and, after the main voltage generating unit is connected to the load, can be quickly stabilized at the direct-current high voltage generated by the main voltage generating unit.

According to an aspect of the high-voltage power supply device having the above-described configuration, the auxiliary power supply unit can be configured to further include a second auxiliary switch unit configured to open and close a line connecting the charge power supply unit and the capacitor, and is closed during a period in which the first auxiliary switch unit is open and is opened when the first auxiliary switch unit is closed.

In this configuration, when the first auxiliary switch unit is closed, the second auxiliary switch unit is open, and the charge power supply unit is separated from the capacitor, thus a large current based on the charge accumulated in the capacitor immediately before this can be supplied to the load.

According to another aspect of the high-voltage power supply device having the above-described configuration, the auxiliary power supply unit can be configured to further include a resistance unit that is provided on a line connecting the charge power supply unit and the capacitor, and limits the current from the charge power supply unit through the first auxiliary switch unit when the first auxiliary switch unit is closed.

That is, in this aspect, the second auxiliary switch unit in the above-described aspect is replaced with the resistance unit. In this configuration, when the first auxiliary switch unit is closed, the capacitor and the charge power supply unit are connected through the resistance unit. However, if a resistance value of the resistance unit is set at a relatively large value, a current is less likely to flow from the charge power supply unit to the load through the resistance unit; therefore, when the first auxiliary switch unit is closed, a large current based on the charge accumulated in the capacitor can be supplied to the load.

The high-voltage power supply device according to the present invention may be a single-polarity power supply device that applies a direct-current high voltage of either positive or negative polarity, but is also applicable to a positive/negative-polarity switchable power supply device that can selectively apply a direct-current high voltage of positive polarity and a direct-current high voltage of negative polarity to the load.

That is, the high-voltage power supply device according to the present invention can be configured in such a way that the main voltage generating unit includes a positive-side main voltage generating unit configured to generate a direct-current high voltage of positive polarity and a negative-side main voltage generating unit configured to generate a direct-current high voltage of negative polarity; the switch unit includes a positive-side switch unit configured to open and close a line connecting a voltage output terminal of the positive-side main voltage generating unit and the load and a negative-side switch unit configured to open and close a line connecting a voltage output terminal of the negative-side main voltage generating unit and the load; and the auxiliary power supply unit includes a positive-side auxiliary power supply unit configured to charge the capacitance of the load to positive polarity by supplying the load with a larger current than a current being able to be supplied by the positive-side main voltage generating unit before or immediately after the positive-side switch unit is closed when application of the direct-current high voltage to the load by the positive-side main voltage generating unit is started by closing the positive-side switch unit being in an open state, and a negative-side auxiliary power supply unit configured to charge the capacitance of the load to negative polarity by supplying the load with a larger current than a current being able to be supplied by the negative-side main voltage generating unit before or immediately after the negative-side switch unit is closed when application of the direct-current high voltage to the load by the negative-side main voltage generating unit is started by closing the negative-side switch unit being in an open state.

According to this configuration, not only when a positive or negative voltage is started being applied to the load with no voltage applied, but also when the polarity of the direct-current high voltage applied to the load is switched from positive to negative or vice versa, the capacitance of the load can be quickly charged to a polarity opposite to the previous polarity, thus a voltage after the switching can be quickly stabilized.

For example, in a TOFMS, a measurement needs to be conducted after the potential of a flight tube whose polarity is switched in accordance with the polarity of an ion to be analyzed is sufficiently stabilized; however, by using the high-voltage power supply device according to the present invention as a power supply device, switching of the potential of the flight tube is quickly performed, thus it is possible to shorten a measurement period with which a measurement of positive ions and a measurement of negative ions are alternately executed.

Advantageous Effects of Invention

In the mass spectrometer according to the present invention, with the high-voltage power supply device, a dedicated auxiliary power supply unit, which is different from a main voltage generating unit having high stability in an output voltage, quickly charges the capacitance of a load when application of the voltage is started from a halted state or when the polarity of the applied voltage is switched; therefore, even if a restraint is imposed on the output current of the main voltage generating unit, the potential of the load can be statically determined to an intended stable value quickly. Accordingly, the output current of the main voltage generating unit having the high voltage stability can be suppressed, thus the increase in cost can be suppressed. Furthermore, it is not necessary to increase the responsiveness to a load change more than is necessary; therefore, it is possible to apply a stable direct-current high voltage to the load.

BRIEF DESCRIPTION OF DRAWINGS

FIGS. 2A to 2F are explanatory diagrams of an operation of the high-voltage power supply device according to the first embodiment when switching the polarity of an output voltage.

FIG. 3 is a schematic configuration diagram of a high-voltage power supply device according to a second embodiment of the present invention.

FIGS. 4A to 4D are timing charts of a control signal when the polarity of an output voltage is switched in the high-voltage power supply device according to the second embodiment.

FIGS. 5A to 5F are explanatory diagrams of an operation of the high-voltage power supply device according to the second embodiment when switching the polarity of the output voltage.

DESCRIPTION OF EMBODIMENTS

First Embodiment

Figure 1:
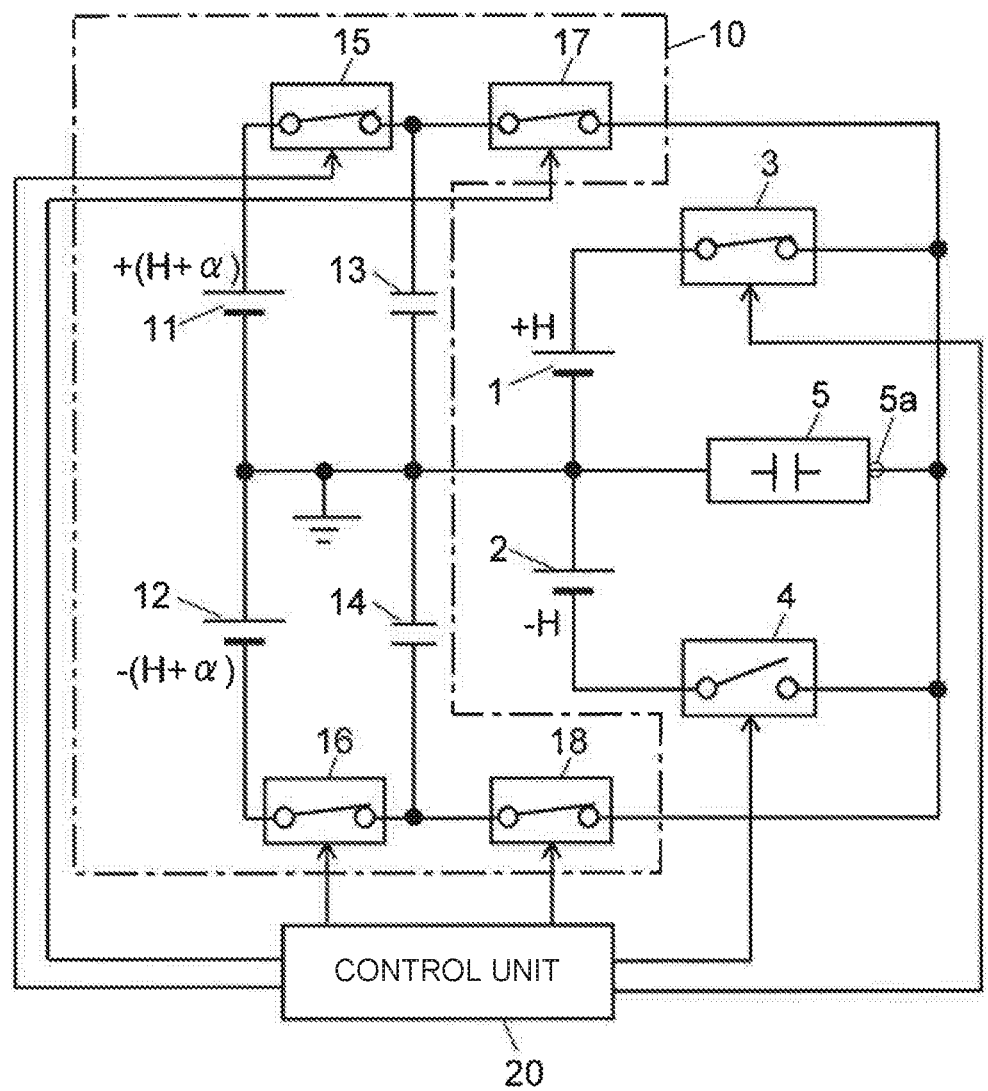
FIG. 1 is a schematic configuration diagram of a high-voltage power supply device according to a first embodiment of the present invention.
Figure 6A:
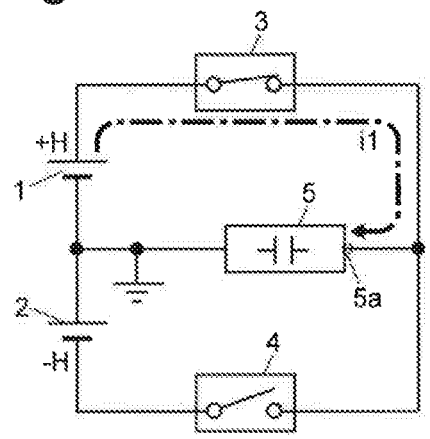
FIGS. 6A to 6D are schematic configurations of a conventional high-voltage power supply device and an explanatory diagram of its operation.
Figure 6B:
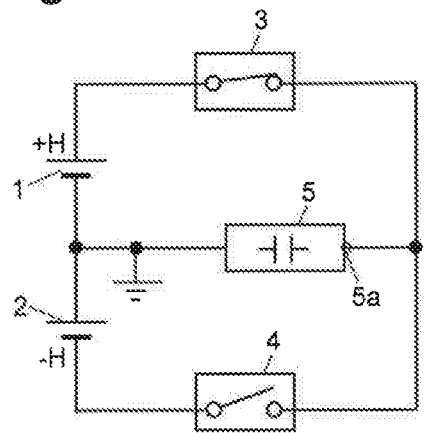
Figure 6D:
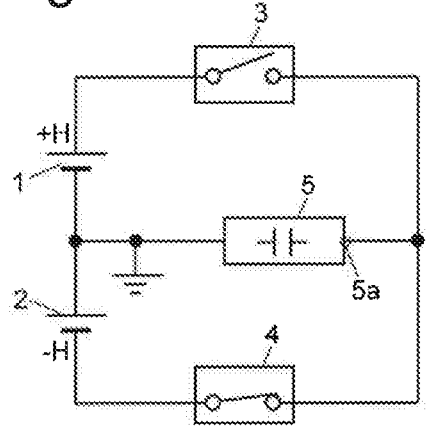
Figure 6C:
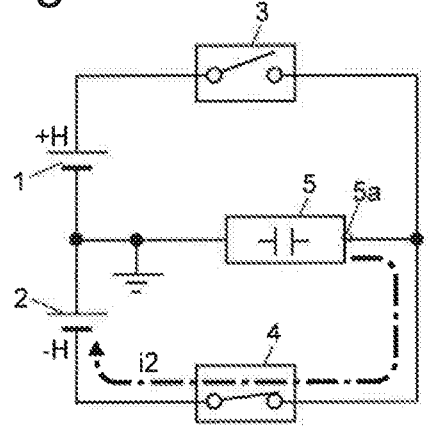

In the following, a first embodiment of a high-voltage power supply device according to the present invention is described with reference to accompanying drawings. FIG. 1 is a schematic configuration diagram of the high-voltage power supply device according to the first embodiment. FIGS. 2A to 2F are explanatory diagrams of an operation of the high-voltage power supply device according to the first embodiment when switching the polarity of an output voltage. In FIG. 1, a component identical or equivalent to the conventional high-voltage power supply device shown in FIGS. 6A to 6D are assigned the same reference numeral.

In the high-voltage power supply device according to the present embodiment, the positive voltage generating unit 1, the negative voltage generating unit 2, the positive-side switch circuit 3, the negative-side switch circuit 4, and the flight tube 5, which is a load, are exactly the same as the conventional high-voltage power supply device shown in FIGS. 6A to 6D; besides these, an auxiliary power supply unit 10 is further added.

The auxiliary power supply unit 10 includes an auxiliary positive voltage generating unit 11 that outputs a positive-polarity direct-current high voltage with a voltage value of $+(H+\alpha)$ [V], an auxiliary negative voltage generating unit 12 that outputs a negative-polarity direct-current high voltage with a voltage value of $-(H+\alpha)$ [V], a first capacitor 13 whose one end is grounded, and a second capacitor 14 whose one end is grounded, a positive-side second auxiliary switch circuit 15 provided on a line electrically connecting the auxiliary positive voltage generating unit 11 and the other end of the first capacitor 13, a positive-side first auxiliary switch circuit 17 provided on a line electrically connecting the other end of the first capacitor 13 and the flight tube 5, a negative-side second auxiliary switch circuit 16 provided on a line electrically connecting the auxiliary negative voltage generating unit 12 and the other end of the second capacitor 14, and a negative-side first auxiliary switch circuit 18 provided on a line electrically connecting the other end of the second capacitor 14 and the flight tube 5.

All of the switch circuits 15 to 18 in the auxiliary power supply unit 10 can include one or more semiconductor switching devices such as MOSFETs, as with the switch circuits 2 and 4. Furthermore, other than semiconductor switching device(s), for example, electromagnetic relay(s) or the like can also be used. Moreover, a control unit 20 controls respective on (closed) and off (open) operations of the switch circuits 3, 4, and 15 to 18, and generally includes mainly a microcomputer containing a microprocessor, a ROM, a RAM, etc.

The voltage value $+(H+\alpha)$ [V] of the direct-current high voltage that is an output of the auxiliary positive voltage generating unit 11 is higher by $\alpha$ [V] than the voltage value H [V] of the direct-current high voltage that is an output of the positive voltage generating unit 1. Likewise, the voltage value $-(H+\alpha)$ [V] of the direct-current high voltage that is an output of the auxiliary negative voltage generating unit 12 is higher in the absolute value by $\alpha$[V] than the voltage value H [V] of the direct-current high voltage that is an output of the negative voltage generating unit 2. As will be described later, $\alpha$[V] is appropriately determined in accordance with respective capacities of the first and second capacitors 13 and 14, a capacitance value Ca of the capacitance of the flight tube 5, etc.

The operation of this high-voltage power supply device when switching the polarity of an applied voltage to the flight tube 5 is described with reference to FIGS. 2A to 2F.

Now, with the negative-side switch circuit 4 in ON state, the positive-side switch circuit 3 in OFF state, and the first auxiliary switch circuits 17 and 18 both in OFF state, the potential of the voltage-applied-side end 5a of the flight tube 5 is assumed to be stable at $-H$ [V]. At this time, the positive-side second auxiliary switch circuit 15 is in ON state, and the first capacitor 13 is charged with the output voltage $+(H+\alpha)$ [V] of the auxiliary positive voltage generating unit 11 (see FIG. 2A). When fully charged, a voltage between both ends of the first capacitor 13 becomes $+(H+\alpha)$ [V].

When the applied voltage to the flight tube 5 is switched from the negative polarity to the positive polarity, first, the negative-side switch circuit 4 and the positive-side second auxiliary switch circuit 15 are put into OFF state, and the positive-side first auxiliary switch circuit 17 is turned ON. Then, the first capacitor 13 and the flight tube 5 are connected through the positive-side first auxiliary switch circuit 17, and a current based on the charge accumulated in the first capacitor 13 flows into the flight tube 5 (see FIG. 2B). Until immediately before this, the capacitance of the flight tube 5 has been charged so that the voltage-applied-side end 5a has the negative polarity; however, it is rapidly charged to the positive polarity by the inflow of the current.

At this time, a voltage H' [V] at the voltage-applied-side end 5a, a capacity Cb [F] of the first capacitor 13, a capacitance value Ca [F] of the capacitance of the flight tube 5, and $\alpha$[V] are in the following relationship.

$$\alpha = (2Ca/Cb)H' \text{ [V]}$$

Therefore, if Ca and Cb are already known, $\alpha$[V] that allows H' [V] to be H [V] is found. For example, if Ca=1 [nF], Cb=7 [nF], and H [V]=±7 [kV], $\alpha$=(2/7)×7=2 [kV]. That is, the output voltage of the auxiliary positive voltage generating unit 11 may be 9 [kV].

After the capacitance of the flight tube 5 has been charged with the current supplied from the first capacitor 13, the positive-side first auxiliary switch circuit 17 is turned OFF, and the positive-side switch circuit 3 and the positive-side second auxiliary switch circuit 15 are turned ON. Accordingly, the positive voltage generating unit 1 is connected to the flight tube 5, thus a stable direct-current voltage with a voltage value of H [V] is applied to the flight tube 5 (see FIG. 2C). Meanwhile, although the charging voltage is reduced by discharge of the first capacitor 13, the positive-side second auxiliary switch circuit 15 is turned ON, and therefore the first capacitor 13 and the auxiliary positive voltage generating unit 11 are connected again, and the first capacitor 13 is charged until a voltage between its both ends becomes $+(H+\alpha)$ [V]. A measurement is conducted in a state where a stable direct-current voltage from the positive voltage generating unit 1 is applied to the flight tube 5 (see FIG. 2D). At the time of execution of the measurement, the negative-side second auxiliary switch circuit 16 is put into ON state, thus the second capacitor 14 is charged with the output voltage $-(H+\alpha)$ [V] of the auxiliary negative voltage generating unit 12, and a voltage between both ends of the second capacitor 14 becomes $-(H+\alpha)$ [V].

When the measurement is finished, to switch the applied voltage to the flight tube 5 from the positive polarity to the negative polarity, the control unit 20 puts the positive-side switch circuit 3 and the negative-side second auxiliary switch circuit 16 into OFF state, and turns the negative-side first auxiliary switch circuit 18 ON. Then, the second capacitor 14 and the flight tube 5 are connected through the negative-side first auxiliary switch circuit 18, and a current based on the charge accumulated in the second capacitor 14 flows from the flight tube 5 to the second capacitor 14 (see FIG. 2E). Until immediately before this, the capacitance of the flight tube 5 has been charged so that the voltage-applied-side end 5a has the positive polarity; however, it is rapidly charged to the negative polarity by the outflow of the current.

After the capacitance of the flight tube 5 has been charged to the negative polarity by drawing out of the current by the second capacitor 14, the control unit 20 turns the negative-side first auxiliary switch circuit 18 OFF, and turns the positive-side switch circuit 3 and the negative-side second auxiliary switch circuit 16 ON. Accordingly, the negative voltage generating unit 2 is connected to the flight tube 5, thus a stable negative direct-current voltage is applied to the flight tube 5 (see FIG. 2F). Meanwhile, although the charging voltage is reduced by discharge of the second capacitor 14, the negative-side second auxiliary switch circuit 16 is turned ON, and therefore the second capacitor 14 and the auxiliary negative voltage generating unit 12 are connected again, and the second capacitor 14 is charged until a voltage between its both ends becomes −(H+α) [V]. A measurement is conducted in a state where a stable direct-current voltage from the negative voltage generating unit 2 is applied to the flight tube 5 (see FIG. 2A).

As described above, in the high-voltage power supply device according to the first embodiment, when the voltage applied to the flight tube 5 is switched from the positive polarity to the negative polarity or vice versa, in the auxiliary power supply unit 10, a current based on the charge accumulated in the first capacitor 13 or the second capacitor 14 in advance is supplied to the flight tube 5, and the capacitance of the flight tube 5 is charged to a value around the direct-current high voltage of a polarity intended to be switched to. The current supplied from the first capacitor 13 or the second capacitor 14 does not have restraints like those put on the current supplied from the voltage generating unit 1 or 2, and, basically, a large current determined in accordance with a resistance value of an internal resistance (or in a case where a protective resistance or the like is connected in series to the internal resistance, a series resistance value to the resistance) of the first auxiliary switch circuit 17 or 18 flows. Accordingly, charge of the capacitance of the flight tube 5 is performed quickly, and therefore the time (the stabilization time) to become a stable direct-current voltage when the polarity is switched also becomes shorter than a case where there is no auxiliary power supply unit 10.

Second Embodiment

A second embodiment of a high-voltage power supply device according to the present invention is described with reference to FIGS. 3 to 5A to 5F. FIG. 3 is a schematic configuration diagram of the high-voltage power supply device according to the second embodiment. FIGS. 4A to 4D are timing charts of a control signal when the polarity of an output voltage is switched in the high-voltage power supply device according to the second embodiment. FIGS. 5A to 5F are explanatory diagrams of an operation of the high-voltage power supply device according to the second embodiment when switching the polarity of the output voltage. In FIG. 3, a component identical or equivalent to the high-voltage power supply device according to the first embodiment shown in FIG. 1 is assigned the same reference numeral. Furthermore, FIGS. 5A to 5F correspond to FIGS. 2A to 2F, respectively.

In the high-voltage power supply device according to the second embodiment, the two second auxiliary switch circuits 15 and 16 in the high-voltage power supply device according to the first embodiment are replaced with resistors 105 and 106, respectively. These resistors 105 and 106 have a high resistance value of about a few hundreds of kilo-ohms to a few mega-ohms. That is, in the high-voltage power supply device according to the second embodiment, the auxiliary positive voltage generating unit 11 and the first capacitor 13 are constantly connected through the resistor 105, and the auxiliary negative voltage generating unit 12 and the second capacitor 14 are constantly connected through the resistor 106.

As shown in FIG. 5A, with the negative-side switch circuit 4 in ON state, the positive-side switch circuit 3 in OFF state, and the first auxiliary switch circuits 17 and 18 both in OFF state, when the potential of the voltage-applied-side end 5a of the flight tube 5 is stable at −H [V], a voltage between both ends of the first capacitor 13 connected to the auxiliary positive voltage generating unit 11 through the resistor 105 is charged with +(H+α) [V]. After that, when the applied voltage to the flight tube 5 is switched from the negative polarity to the positive polarity, the negative-side switch circuit 4 is put into OFF state, and the control unit 20 gives the positive-side first auxiliary switch circuit 17 a control signal shown in FIG. 4A to turn it on only for a short time (in the present example, 1 ms). Then, the first capacitor 13 and the flight tube 5 are connected through the positive-side first auxiliary switch circuit 17, and a current based on the charge accumulated in the first capacitor 13 flows into the flight tube 5 (see FIG. 5B). Until immediately before this, the capacitance of the flight tube 5 has been charged so that the voltage-applied-side end 5a has the negative polarity; however, it is rapidly charged to the positive polarity by the inflow of the current. When the positive-side first auxiliary switch circuit 17 is ON, it is also connected to the auxiliary positive voltage generating unit 11 and the flight tube 5 through the resistor 105; however, the resistance value of the resistor 105 is high, thus, by making a time in which the positive-side first auxiliary switch circuit 17 is ON sufficiently short as compared with a below-described ON time of the positive-side switch circuit 3, a current flowing from the auxiliary positive voltage generating unit 11 to the flight tube 5 can be mostly ignored.

After the capacitance of the flight tube 5 has been charged with the current supplied from the first capacitor 13, the control unit 20 turns the positive-side first auxiliary switch circuit 17 OFF, and gives the positive-side switch circuit 3 a control signal shown in FIG. 4B to turn it ON. This ON time is 24 ms in the present example, and, as described above, is sufficiently long as compared with the ON time of the positive-side first auxiliary switch circuit 17. Accordingly, the positive voltage generating unit 1 is connected to the flight tube 5, thus a stable direct-current voltage with a voltage value of H [V] is applied to the flight tube 5 (see FIG. 5C). Meanwhile, although the charging voltage is reduced by discharge of the first capacitor 13, the first capacitor 13 and the auxiliary positive voltage generating unit 11 are connected through the resistor 105; therefore, after the discharge, the first capacitor 13 is started being charged, and is charged until a voltage between its both ends becomes+(H+α) [V]. A measurement is conducted in a state where a stable direct-current voltage from the positive voltage generating unit 1 is applied to the flight tube 5 (see FIG. 5D). Meanwhile, in a state where the negative-side first auxiliary switch circuit 18 is OFF, a voltage between both ends of the second capacitor 14 is charged to −(H+α) [V] by the auxiliary negative voltage generating unit 12.

When the measurement is finished, to switch the applied voltage to the flight tube 5 from the positive polarity to the negative polarity, the control unit 20 puts the positive-side switch circuit 3 into OFF state, and turns the negative-side first auxiliary switch circuit 18 ON only for a short time (in this example, 1 ms). Then, the second capacitor 14 and the flight tube 5 are connected through the negative-side first auxiliary switch circuit 18, and a current based on the charge accumulated in the second capacitor 14 flows from the flight tube 5 to the second capacitor 14 (see FIG. 5E). Until immediately before this, the capacitance of the flight tube 5 has been charged so that the voltage-applied-side end 5a has the positive polarity; however, it is rapidly charged to the negative polarity by the outflow of the current.

After the capacitance of the flight tube 5 has been charged to the negative polarity by drawing out of the current by the second capacitor 14, the control unit 20 turns the negative-side first auxiliary switch circuit 18 OFF, and turns the positive-side switch circuit 3 ON. Accordingly, the negative voltage generating unit 2 is connected to the flight tube 5, thus a stable negative direct-current voltage is applied to the flight tube 5 (see FIG. 5F). Meanwhile, although the charging voltage is reduced by discharge of the second capacitor 14, when the negative-side first auxiliary switch circuit 18 is turned OFF, the second capacitor 14 is again charged until a voltage between its both ends becomes −(H+α) [V]. A measurement is conducted in a state where a stable direct-current voltage from the negative voltage generating unit 2 is applied to the flight tube 5 (see FIG. 5A).

As described above, in the high-voltage power supply device according to the second embodiment, by making respective ON times of the first auxiliary switch circuits 17 and 18 sufficiently short as compared with respective ON times of the switch circuits 3 and 4, broadly similar effects to those in the first embodiment are achieved. In a circuit simulation performed by the present inventors, it was confirmed that the stabilization time was shortened from about 40 ms to about 10 ms.

It is to be noted that in the above description, the auxiliary power supply unit 10 is used when polarity of a voltage applied to the flight tube 5 is switched; needless to say, rising of the voltage can be speeded up by using the auxiliary power supply unit 10 also when application of a positive or negative high voltage is started from a state where no voltage has been applied.

Furthermore, the above-described configuration of the high-voltage power supply device is merely an example of the present invention, and it is a matter of course that any modifications, additions, and alterations made appropriately within the gist of the present invention are also embraced in the scope of the claims of the present application.

Moreover, it is obvious that the high-voltage power supply device according to the present invention not only can be used for a purpose of applying a high voltage to a flight tube of a TOFMS, but also can be used for various purposes and apparatuses that require switching of a high voltage of about ±several [kV] at high speed.

REFERENCE SIGNS LIST

1 . . . Positive Voltage Generating Unit
2 . . . Negative Voltage Generating Unit
3 . . . Positive-Side Switch Circuit
4 . . . Negative-Side Switch Circuit
5 . . . Flight Tube
5a . . . Voltage-Applied-Side End
10 . . . Auxiliary Power Supply Unit
11 . . . Auxiliary Positive Voltage Generating Unit
12 . . . Auxiliary Negative Voltage Generating Unit
13 . . . First Capacitor
14 . . . Second Capacitor
15 . . . Positive-Side Second Auxiliary Switch Circuit
16 . . . Negative-Side Second Auxiliary Switch Circuit
17 . . . Positive-Side First Auxiliary Switch Circuit
18 . . . Negative-Side First Auxiliary Switch Circuit
105, 106 . . . Resistor
20 . . . Control Unit

The invention claimed is:

1. A mass spectrometer with a high-voltage power supply device that applies a direct-current high voltage to a load, the high-voltage power supply device comprising:
   a) a main voltage generating unit including a first DC power supply with a predetermined first output value;
   b) a switch unit provided on a line connecting a voltage output terminal of the main voltage generating unit and the load;
   c) an auxiliary power supply unit including a capacitor, a first auxiliary switch unit provided on a line connecting the capacitor and the load, and a second DC power supply with a predetermined second output value, an absolute value of the predetermined second output value being larger than an absolute value of the predetermined first output value; and
   d) a controller programmed to control on and off operations of the switch unit and the first auxiliary switch unit so that a capacitance of the load is charged by supplying the load with a larger current than a current being able to be supplied by the main voltage generating unit before or immediately after the switch unit is closed when application of the direct-current high voltage to the load by the main voltage generating unit is started by closing the switch unit, wherein
the predetermined second output value is higher in an absolute value by α [V] than the predetermined first output value, α being determined by α=(2Ca/Cb) H' [V], where Ca is a capacitance value of the capacitance of the load, Cb is a capacitance value of the capacitor, and H' is a voltage value of the direct-current high voltage applied to the load.

2. The mass spectrometer according to claim 1, wherein the auxiliary power supply unit further includes a second auxiliary switch provided on a line connecting the second DC power supply and the capacitor, and the controller is further programmed to control on and off operations of the second auxiliary switch so that the second auxiliary switch is closed during a period in which the first auxiliary switch unit is open, and is opened when the first auxiliary switch unit is closed.

3. The mass spectrometer according to claim 2, wherein the main voltage generating unit includes a positive-side main voltage generating unit configured to generate a direct-current high voltage of positive polarity, and a negative-side main voltage generating unit configured to generate a direct-current high voltage of negative polarity,
the switch unit includes a positive-side switch unit provided on a line connecting a voltage output terminal of the positive-side main voltage generating unit and the load, and a negative-side switch unit provided on a line connecting a voltage output terminal of the negative-side main voltage generating unit and the load,
the auxiliary power supply unit includes a positive-side auxiliary power supply unit and a negative-side auxiliary power supply unit, and
the controller is programmed to control on and off operations of the positive-side switch unit so that the capacitance of the load is charged to positive polarity by supplying the load with a larger current than a current being able to be supplied by the positive-side main voltage generating unit before or immediately after the positive-side switch unit is closed when application of the direct-current high voltage to the load by the positive-side main voltage generating unit is started by closing the positive-side switch unit, and programmed to control on and off operations of the negative-side switch unit so that the capacitance of the load is charged to negative polarity by supplying the load with a larger current than a current being able to be supplied by the negative-side main voltage generating unit before or immediately after the negative-side switch unit is closed when application of the direct-current high voltage to the load by the negative-side main voltage generating unit is started by closing the negative-side switch unit.

4. The mass spectrometer according to claim 3, wherein the mass spectrometer is a time-of-flight mass spectrometer and the load is a flight tube.

5. The mass spectrometer according to claim 2, wherein the mass spectrometer is a time-of-flight mass spectrometer and the load is a flight tube.

6. The mass spectrometer according to claim 1, wherein the auxiliary power supply unit further includes a resistance unit that is provided on a line connecting the second DC power supply and the capacitor, and is configured to limit a current from the second DC power supply through the first auxiliary switch unit when the first auxiliary switch unit is closed.

7. The mass spectrometer according to claim 6, wherein the main voltage generating unit includes a positive-side main voltage generating unit configured to generate a direct-current high voltage of positive polarity, and a negative-side main voltage generating unit configured to generate a direct-current high voltage of negative polarity, the switch unit includes a positive-side switch unit provided on a line connecting a voltage output terminal of the positive-side main voltage generating unit and the load, and a negative-side switch unit provided on a line connecting a voltage output terminal of the negative-side main voltage generating unit and the load, the auxiliary power supply unit includes a positive-side auxiliary power supply unit and a negative-side auxiliary power supply unit, and the controller is programmed to control on and off operations of the positive-side switch unit so that the capacitance of the load is charged to positive polarity by supplying the load with a larger current than a current being able to be supplied by the positive-side main voltage generating unit before or immediately after the positive-side switch unit is closed when application of the direct-current high voltage to the load by the positive-side main voltage generating unit is started by closing the positive-side switch unit, and programmed to control on and off operations of the negative-side switch unit so that the capacitance of the load is charged to negative polarity by supplying the load with a larger current than a current being able to be supplied by the negative-side main voltage generating unit before or immediately after the negative-side switch unit is closed when application of the direct-current high voltage to the load by the negative-side main voltage generating unit is started by closing the negative-side switch unit.

8. The mass spectrometer according to claim 7, wherein the mass spectrometer is a time-of-flight mass spectrometer and the load is a flight tube.

9. The mass spectrometer according to claim 6, wherein the mass spectrometer is a time-of-flight mass spectrometer and the load is a flight tube.

10. The mass spectrometer according to claim 1, wherein the main voltage generating unit includes a positive-side main voltage generating unit configured to generate a direct-current high voltage of positive polarity, and a negative-side main voltage generating unit configured to generate a direct-current high voltage of negative polarity, the switch unit includes a positive-side switch unit provided on a line connecting a voltage output terminal of the positive-side main voltage generating unit and the load, and a negative-side switch unit provided on a line connecting a voltage output terminal of the negative-side main voltage generating unit and the load, the auxiliary power supply unit includes a positive-side auxiliary power supply unit and a negative-side auxiliary power supply unit, and the controller is programmed to control on and off operations of the positive-side switch unit so that the capacitance of the load is charged to positive polarity by supplying the load with a larger current than a current being able to be supplied by the positive-side main voltage generating unit before or immediately after the positive-side switch unit is closed when application of the direct-current high voltage to the load by the positive-side main voltage generating unit is started by closing the positive-side switch unit, and programmed to control on and off operations of the negative-side switch unit so that the capacitance of the load is charged to negative polarity by supplying the load with a larger current than a current being able to be supplied by the negative-side main voltage generating unit before or immediately after the negative-side switch unit is closed when application of the direct-current high voltage to the load by the negative-side main voltage generating unit is started by closing the negative-side switch unit.

11. The mass spectrometer according to claim 10, wherein the mass spectrometer is a time-of-flight mass spectrometer and the load is a flight tube.

12. The mass spectrometer according to claim 1, wherein the mass spectrometer is a time-of-flight mass spectrometer and the load is a flight tube.

* * * * *